Oct. 29, 1929.　　　　R. R. MAUK ET AL　　　1,733,269
AUTOMOBILE SECURING MEANS FOR FREIGHT CARS
Filed May 4, 1928　　　3 Sheets-Sheet 1
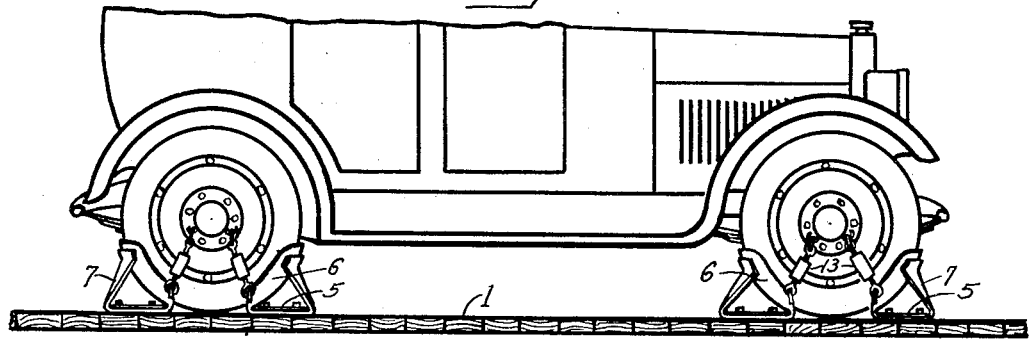
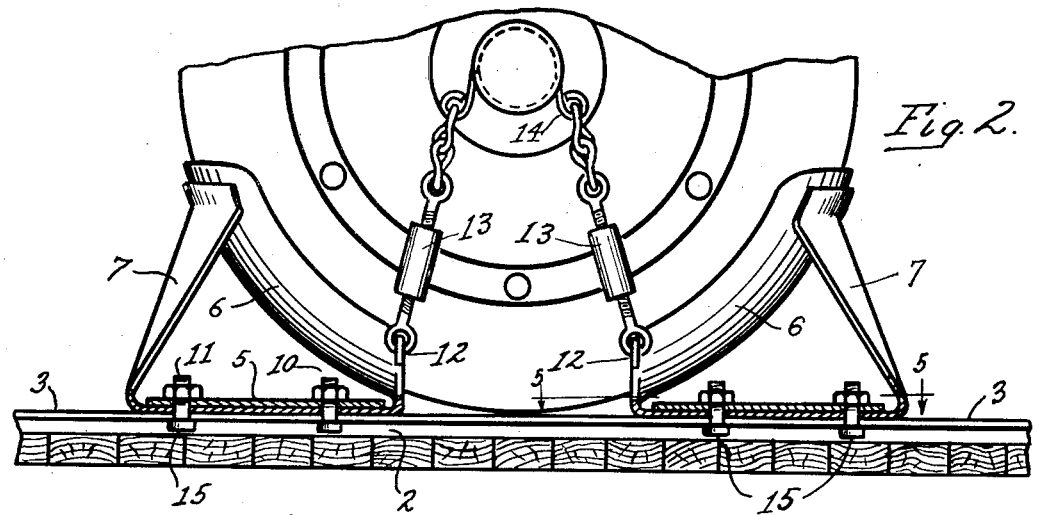
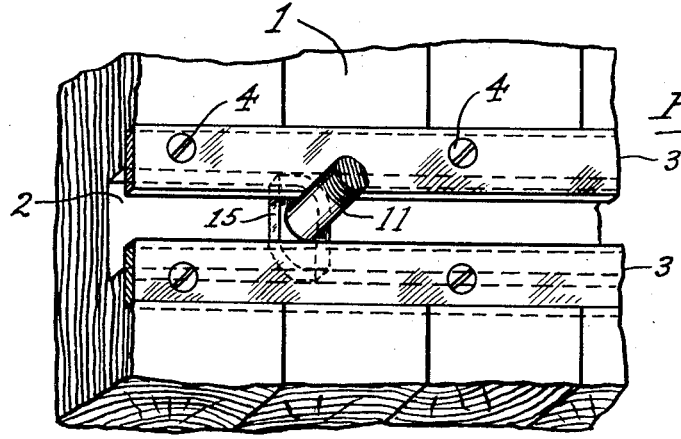
INVENTOR
Robert R. Mauk.
Harry H. Mills.
BY
Cyrus N. Rice, ATTORNEY Oct. 29, 1929.   R. R. MAUK ET AL   1,733,269
AUTOMOBILE SECURING MEANS FOR FREIGHT CARS
Filed May 4, 1928   3 Sheets-Sheet 2
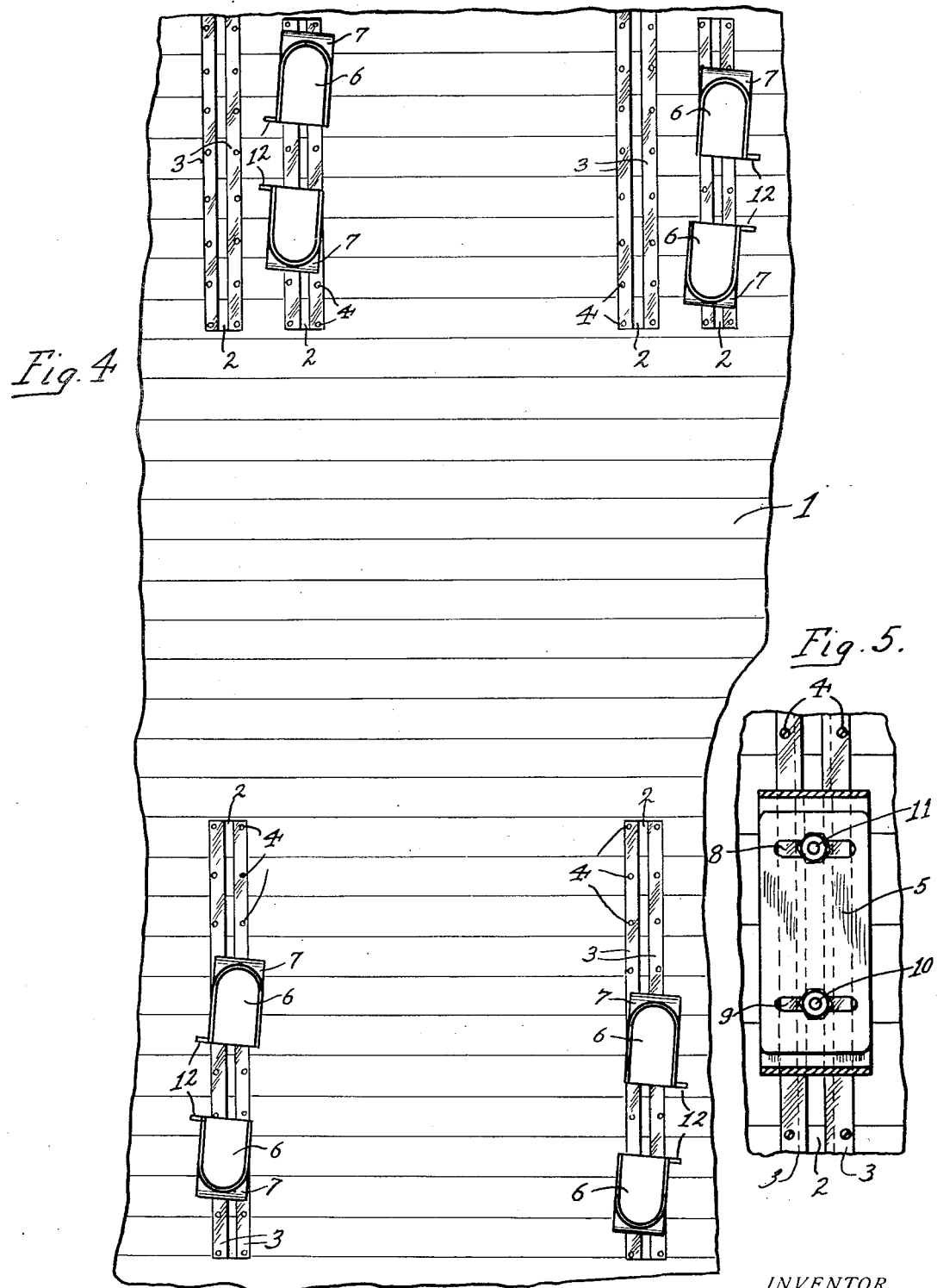

Oct. 29, 1929.　　　R. R. MAUK ET AL　　　1,733,269
AUTOMOBILE SECURING MEANS FOR FREIGHT CARS
Filed May 4, 1928　　　3 Sheets-Sheet 3
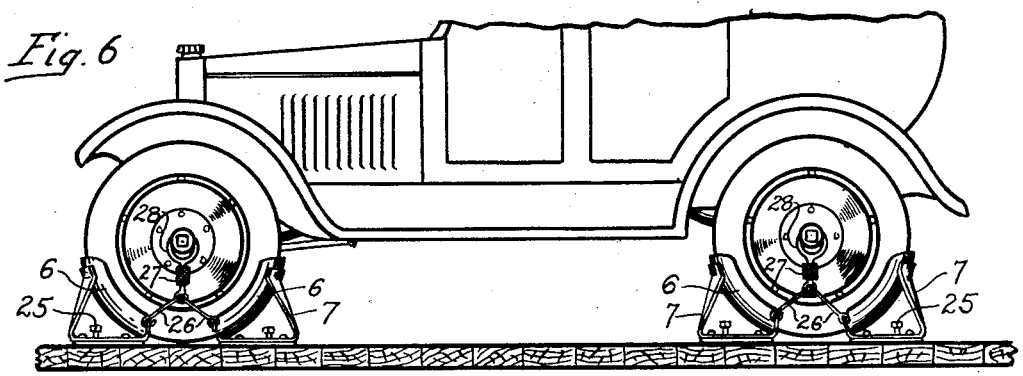
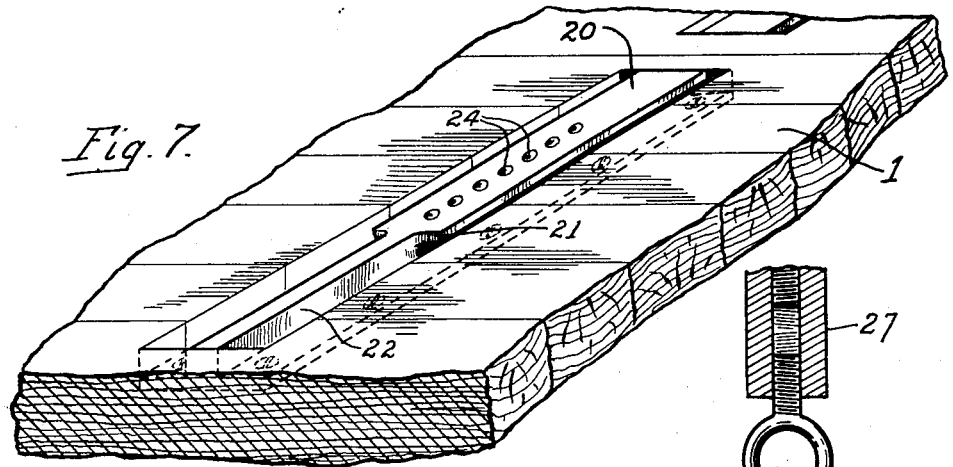
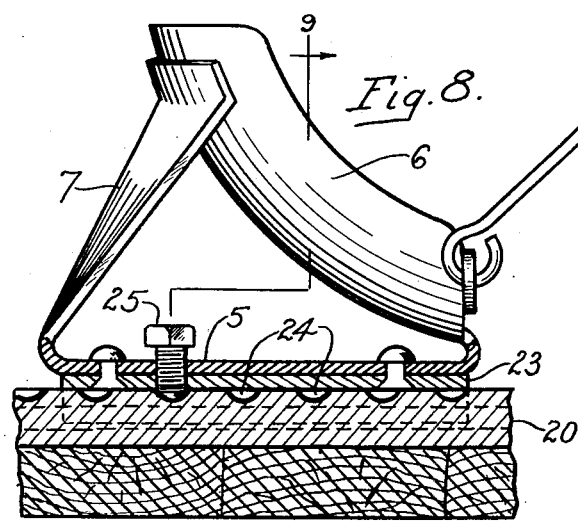
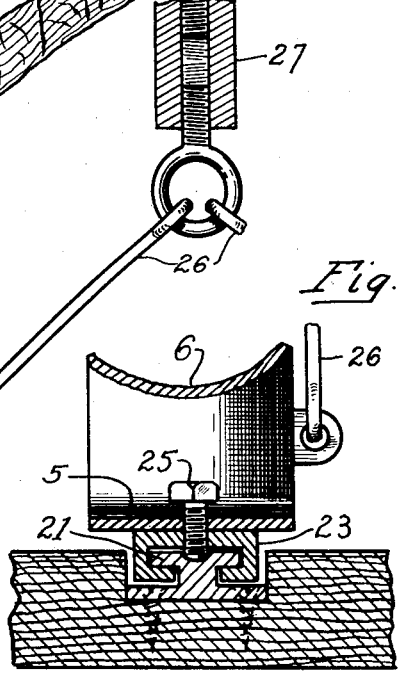
INVENTOR
Robert R. Mauk.
Harry H. Mills.
BY Cyrus N. Rice,
ATTORNEY
Witness:
G. E. Redding.

Patented Oct. 29, 1929

1,733,269

UNITED STATES PATENT OFFICE

ROBERT R. MAUK AND HARRY A. MILLS, OF GRAND RAPIDS, MICHIGAN

AUTOMOBILE SECURING MEANS FOR FREIGHT CARS

Application filed May 4, 1928. Serial No. 275,074.

This invention relates to means for securing automobiles and the like in freight cars during shipment.

The main objects of this invention are to provide an improved form of wheel block which is readily adjustable to fit vehicle wheels which are spaced variable distances apart; to provide such a block and connections therefor which will permit of ready adjustment both longitudinally of the freight car and transversely thereof; to provide a construction which can be readily adjusted to hold the wheels of a vehicle which is positioned at an angle to the longitudinal axis of the freight car; to provide wheel blocks and securing means therefor which can be readily and quickly removed from attachment to the freight car floor, and likewise can be quickly placed in position at any point; and to provide an improved construction which when incorporated in the floor of a freight car will eliminate the method in use at present of driving nails into the car floor and thereby ruining the planking.

An illustrative embodiment of this invention is shown in the accompanying drawings, in which:

Fig. 1 is a fragmentary view in elevation of an automobile anchored to the floor of a freight car with our improved securing means.

Fig. 2 is an enlarged fragmentary view in elevation of one wheel secured by our improved means, part thereof being shown in section.

Fig. 3 is an enlarged view in perspective of a portion of the freight car floor and tracks secured thereto with one of the improved forms of wheel block fastening bolts.

Fig. 4 is a top plan view of a portion of the floor of a freight car equipped with our improved anchoring means.

Fig. 5 is an enlarged sectional view taken on the line 5—5 of Fig. 2.

Fig. 6 is a fragmentary view in elevation of an automobile anchored to the floor of a freight car using a modified form of our securing means.

Fig. 7 is an enlarged fragmentary view in perspective of a portion of freight car flooring as shown in Fig. 6, showing the modified form of anchoring rail.

Fig. 8 is an enlarged fragmentary detail, partly in section and partly in elevation of one of the wheel blocks with the anchoring rail to which it is secured.

Fig. 9 is a sectional view taken on the line 9—9 of Fig. 8.

Heretofore in the shipment of automobiles to distant points in freight cars, it has been customary to use shaped wooden blocks which are nailed to the floor of the car for abutting against each side of the wheels and metal straps of various forms and arrangements are looped over the axle or hub of the automobile and the lower ends of such straps nailed to the floor of the car. In the shipment of the large types of cars, the hold-down strap which is looped over the end of the hub is in some instances provided with an elongated foot which is nailed to the car floor. Some of these devices require as high as 32 nails for each foot thus secured.

This practice of driving a large number of nails into the floors of the freight cars, is very objectionable due to the fact that the floors of the freight cars are very quickly ruined and are so split and weakened by the nails and nail holes that the cars have to be refloored at very short intervals, in order to have a substantial enough floor to hold new nails driven therein.

This practice of nailing down blocks and binding straps is furthermore a great economic waste as these materials are thrown away and discarded when the automobile has reached its destination and is removed from the freight car. At the present time there is one automobile, having international distribution, where twenty seven dollars worth of this blocking and binding material is used in each car load of motor cars, all of which is thrown away at the destination of each shipment.

This economic waste is not confined entirely to the automobile company but as regards the railroad companies, it has been determined that the cost of maintaining a satisfactory acceptacle floor in freight cars used for automobile shipment exclusively is approximately one hundred dollars per year per car. This high maintenance cost is directly attributable to the practice of punching the floor of the freight car full of holes by driving large numbers of nails in closely confined areas.

In the present invention, the freight car floors are equipped with a permanent anchoring rail structure which is flush with the surface of the floor and a series of metal wheel blocks are provided which can be detachably secured to these anchor rails at any desirable point. When the shipment has reached its destination, these metal wheel blocks are quickly and readily detached from the floor of the car and shipped back to the point of origin for use again.

The entire cost of our improved anchoring means and cost of installing the same in a freight car is materially less than the yearly floor maintenance of freight cars used exclusively for automobile shipment. Car floors so equipped with our improved anchoring means require substantially no maintenance for a long period of time and the yearly depreciation on equipment used is but a small fraction of the original cost.

In the construction shown in the drawings, a freight car floor 1 is channeled out longitudinally of the car with shallow grooves 2 which are suitably positioned with respect to the floor of the car so as to be in substantial registry with the position of an automobile when placed therein for shipment. The grooves 2 are provided at each side thereof with anchoring rails 3 secured by countersunk bolts 4 to the floor of the car. The adjacent lateral marginal edges of the rails 3 overlap the grooves 2 and are in spaced relationship to each other so as to form a longitudinally extending slot. The rails 3 are preferably countersunk with respect to the floor of the car so as to be flush therewith.

Improved wheel blocks are provided for abutting against the wheels of the automobile and comprise a horizontally disposed base 5 preferably of double thickness pressed steel, spot welded or otherwise suitably secured together. The bearing base 5 supports an arcuate shaped contact face 6 for fitting against the outer periphery of the wheel tire and said contact face is preferably semi-circular in transverse cross section so as to fit up around the sides of the tire and prevent lateral movement with respect thereto. The contact face 6 is mounted at an angle with respect to the vertical. The lower end thereof is closely adjacent the bearing base 5 and may be formed integrally therewith as shown in the drawings. The upper end of face member 6 is preferably supported by a brace 7 integrally formed on the opposite end of the bearing base 5.

Base member 5 is preferably provided with a pair of transversely extending slots 8 and 9, as shown in Fig. 5 of the drawings, which receive the upstanding specially constructed studs 10 and 11 respectively, threaded nuts being provided on the ends of said studs for tightening down against the base member.

The heads 15 of the studs 10 and 11 are specially made, as shown most clearly in Fig. 3 of the drawings, said head being elongated and having a width which is slightly less than the width of the slot formed by the spaced rails 3 and said head having a length slightly greater than the width of the groove 2 which is channeled out of the floor 1 of the freight car.

By having a head of the foregoing size and shape on the studs, these heads may be inserted at any point between the rails 3 and when the nut thereon is turned to the right to tighten up the stud, the elongated head thereof will rotate until it comes in engagement with the side walls of the slot 2 thereby engaging the head against the under sides of the rails 3.

The wheel blocks are also provided with means for tying down the axle of the vehicle secured thereby and comprise outwardly extending ears 12 to which are secured turnbuckles 13. The turnbuckles 13 have their opposite ends connected to a yoke 14 which fits over the hub of the vehicle wheel.

In the operation and use of this device, the freight car floors are channeled out and provided with the spaced anchoring rails 3 flush with the floors thereof. The automobiles are then loaded into the freight car and placed in position with their wheels substantially registering with the slots formed by each pair of anchoring rails.

Pairs of wheel blocks, which are preferably made in rights and lefts and loosely held together by the turnbuckles 13 and yoke 14, are then placed in position, one pair for each wheel of the automobile. The elongated heads 15 of the studs 10 and 11 are turned parallel with the anchoring rails and with their respective bases and inserted through the slot formed by the anchoring rails 3. The wheel blocks are then pushed snugly up against the tire of the vehicle from opposite sides thereof and the nuts on the studs 10 and 11 tightened. Initial rotation of the nuts on the studs will rotate the elongated heads 15 until the ends thereof abut against the side walls of the channel 2, at which time further rotation is prevented and the nuts can be securely tightened down against the upper surface of the bearing base 5.

By reason of the transverse slots 8 and 9 in the bases of the wheel blocks, these blocks may be adjusted transversely with respect to the longitudinal axis of the freight car so as to accommodate the wheel blocks to variations in distances between pairs of wheels, which distances vary slightly in different makes of cars.

After the nuts on the securing studs have been tightened down, the yoke 14 is passed over the hub of the vehicle and the turnbuckles 13 tightened down so as to hold the wheel of the automobile securely in position.

Occasionally it is desirable to place one of the automobiles in a freight car at an angle with respect to the longitudinal axis of the car, so as to conserve space. The transverse slots 8 and 9 in the base of the wheel blocks permit the blocks to be adjusted at such angle, as shown particularly in Fig. 4 of the drawings, one of the bearing blocks for each wheel being shifted to the left of the anchoring rails and its co-operating block being shifted to the right thereof, both blocks being rotated sufficiently to bring them in axial alignment with each other.

An additional or double set of rails is provided, as shown at the top of Fig. 4, which are spaced laterally with respect to the regular alined rails, and the wheel blocks for the set of wheels at the other end of the automobile are mounted on these rails when the vehicles are placed at an angle with respect to the freight car. Loading in this manner permits the front ends of two automobiles to be interfitted, with the protruding front end of one side rail of the chassis frame disposed between and embraced by the chassis side frames of the other.

When the automobile has reached its destination, the nuts on the studs are loosened at which time the elongated heads 15 may be turned to the left so as to register with the slot formed by the spaced anchoring rails 3 and the heads withdrawn upwardly, thus readily and quickly detaching the wheel block from the freight car floor.

It will be noted that by positioning the wheel blocks with the lower end of the bearing base closely adjacent to the floor of the car, in the form of a thin toe which extends back under the tire, close to its point of contact with the floor, any tendency of the automobile to roll forward or backward causes the wheel to roll up onto the face of the wheel block and automatically bind the block down against the floor of the car so that very little strain is placed upon the studs 10 and 11, and in actual practice only one such stud need be used in most instances.

In the modification shown in Figs. 6, 7, 8 and 9, the floor 1 of the freight car is channeled out to receive a transverse flat broad I-beam 20 which is secured therein with the top surface substantially flush with the top surface of the car floor. One end of the anchoring rail 20 has the top flanges 21 cut away for a short distance so as to leave the upstanding web portion 22. The under sides of the wheel block bases 5 are provided with fittings 23 which have a broad T-shaped slot therein, the inwardly turned flanges of which embrace the web 22 of the anchoring rail 20 and engage under the top flange 21 thereof. Two such anchoring rails are provided for each wheel of the automobile to be placed in the freight car.

The top surface of the rails 20 are provided with a longitudinally extending medially positioned row of spaced recesses 24 which are adapted to receive the lower end of a stud 25 threaded through the base 5 of the wheel blocks. Suitable links 26 are provided for connecting the blocks together, said links being joined to one end of a turnbuckle 27, the other end of which is provided with a relatively large ring 28 for passing over the end of the hub of the automobile being anchored.

In the operation and use of this modified form, the floor 1 of the freight car is channeled out and equipped with a suitable number of the rails 20. A pair of rails is provided for each wheel of the automobile to be shipped therein.

The wheel blocks are then placed on the rails at the end thereof where the top flanges 21 are cut away, and slid toward the other end thereof so as to engage under the top flange of the rail. When the blocks have been pushed snugly up against the wheels of the vehicle being secured, the studs 25 threaded in the base 5 of the blocks are then screwed down so that the lower end thereof passes into one of the recesses 24 formed in the top surface of the rail 20. The ring 28 on the turnbuckle 27 is then hooked over the hub of the wheel and the turnbuckle tightened down so as to tie down the automobile in a secure and rigid manner.

Although but one specific embodiment of this invention has been herein shown and described, it will be understood that numerous details of the construction shown may be altered or omitted without departing from the spirit of this invention as defined by the following claims.

We claim:

1. In a freight car construction, the combination of a car floor having longitudinally extending anchoring rails secured thereto, and wheel blocks longitudinally slidable on said anchoring rails, said blocks being pivotally and transversely adjustable in a horizontal plane at any point on said rails.

2. In a freight car construction, the combination of a car floor having longitudinally extending anchoring rails secured thereto, and wheel blocks longitudinally slidable on said anchoring rails, said blocks having transversely extending slots therein, and securing members passing through said slots and engaging said rails for adjustably positioning said blocks transversely with respect to said rails.

3. In a freight car construction, the combination of a car floor having longitudinally extending channels in the surface thereof, anchoring rails secured to said floor at each side of said channels with their adjacent marginal edges overlapping said channels in spaced relationship to form slots, anchor bolts having elongated heads adapted to pass into said slots when in one position and to abut the sides of said channels and engage the under sides of said rails when said heads are turned to another position, and wheel blocks secured to said anchor bolts.

4. In a freight car construction, the combination of a car floor having longitudinally extending anchoring rails secured thereto, a pair of cooperating wheel blocks having transverse slots therein, and means adjustable longitudinally on said rails and transversely in said slots for securing said blocks to said rails.

5. A wheel block comprising a horizontal bearing base, an arcuate contact face for fitting the periphery of a wheel, said contact face being semicircular in cross section to embrace the sides of a wheel tire placed therein, said bearing base having a transversely extending slot therein, and an anchor bolt slidably mounted in said slot.

6. In a freight car construction, the combination of a car floor having longitudinally extending channels in the surface thereof, anchoring rails secured to said floor at each side of said channels with their adjacent marginal edges overlapping said channels in spaced relationship to form slots, anchor bolts having elongated heads adapted to pass into said slots when in one position and to abut the sides of said channels and engage the under sides of said rails when said heads are turned to another position, a pair of cooperating wheel blocks having transverse slots therein for receiving said anchor bolts, whereby said blocks may be secured to said car floor, as and for the purpose set forth.

In testimony whereof we have hereunto set our hands at Grand Rapids, Michigan, this 27th day of April, 1928.

ROBERT R. MAUK.
HARRY A. MILLS.